T. KERR.

CABLE GRIP FOR CARS.

No. 10,821. Reissued Mar. 22, 1887.

Witnesses

Geo. W. Breck.
Edwin Seger.

Inventor

Thomas Kerr

By his Attorney

W. C. Witter.

N. PETERS, Photo-Lithographer, Washington, D. C.

T. KERR.
CABLE GRIP FOR CARS.
No. 10,821. Reissued Mar. 22, 1887.
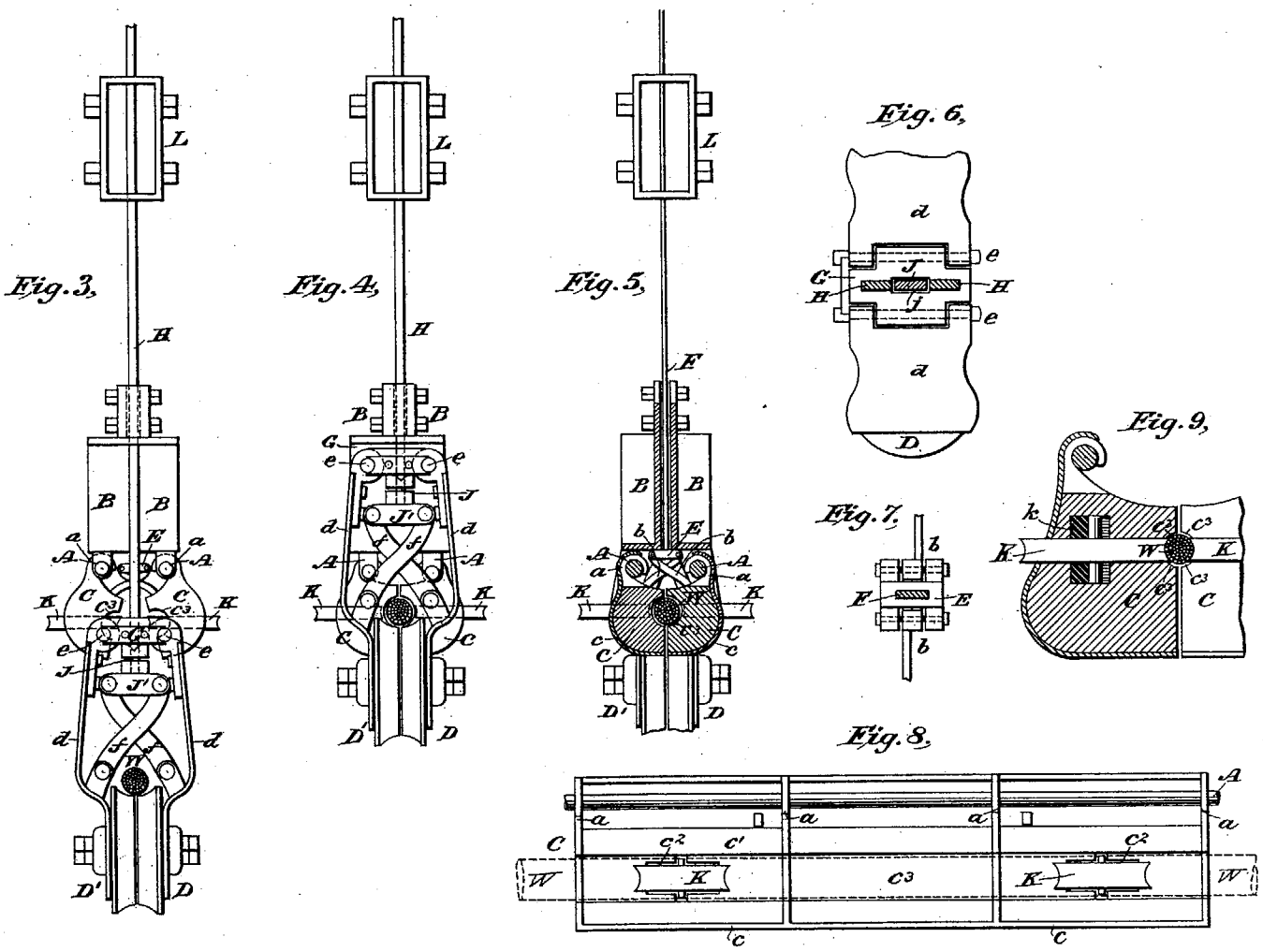
Witnesses
Geo. W. Breck.
Edwin Seger.
Inventor
Thomas Kerr
By his Attorney
W. C. Witter.
N. PETERS, Photo-Lithographer, Washington, D. C.

UNITED STATES PATENT OFFICE.

THOMAS KERR, OF NEW YORK, N. Y.

CABLE-GRIP FOR CARS.

SPECIFICATION forming part of Reissued Letters Patent No. 10,821, dated March 22, 1887.

Original No. 353,361, dated November 30, 1886. Application for reissue filed February 28, 1887. Serial No. 229,262.

*To all whom it may concern:*

Be it known that I, THOMAS KERR, of the city, county, and State of New York, have invented a new and Improved Cable-Grip for Cars, of which the following is a full, clear, and exact description.

This invention consists, principally, of a cable-grip provided with means for lifting the cable from the sheaves on which it runs up to and between the jaws of the grip.

The invention also consists in the employment of swinging jaws for grasping the cable, and also for the means of operating the jaws; also, in providing the jaws with horizontally-pivoted wheels to grasp the cable and start the car before the main jaws grasp the cable. I prefer to use opening and closing wheels for lifting the cable, and these, together with the means for opening and closing them and means for raising and lowering them, also constitute a part of my invention.

The invention finally consists of the construction, arrangement, and combination of parts, all as hereinafter described and claimed.

Reference is to be had to the accompanying drawings, forming part of this specification, in which similar letters of reference indicate corresponding parts in all the figures.

Figure 2:
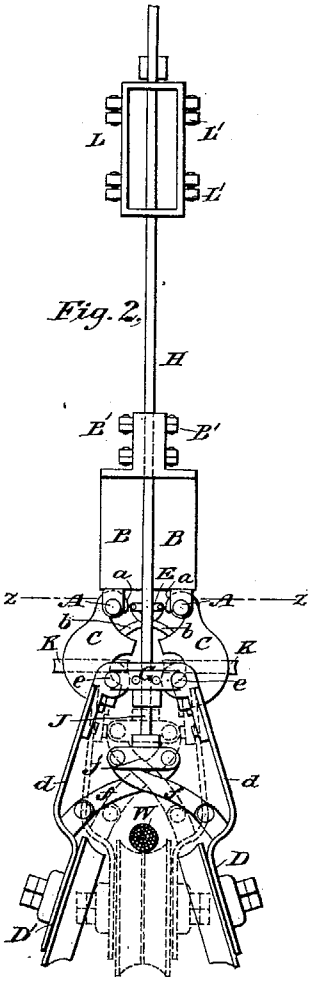
Figure 1:
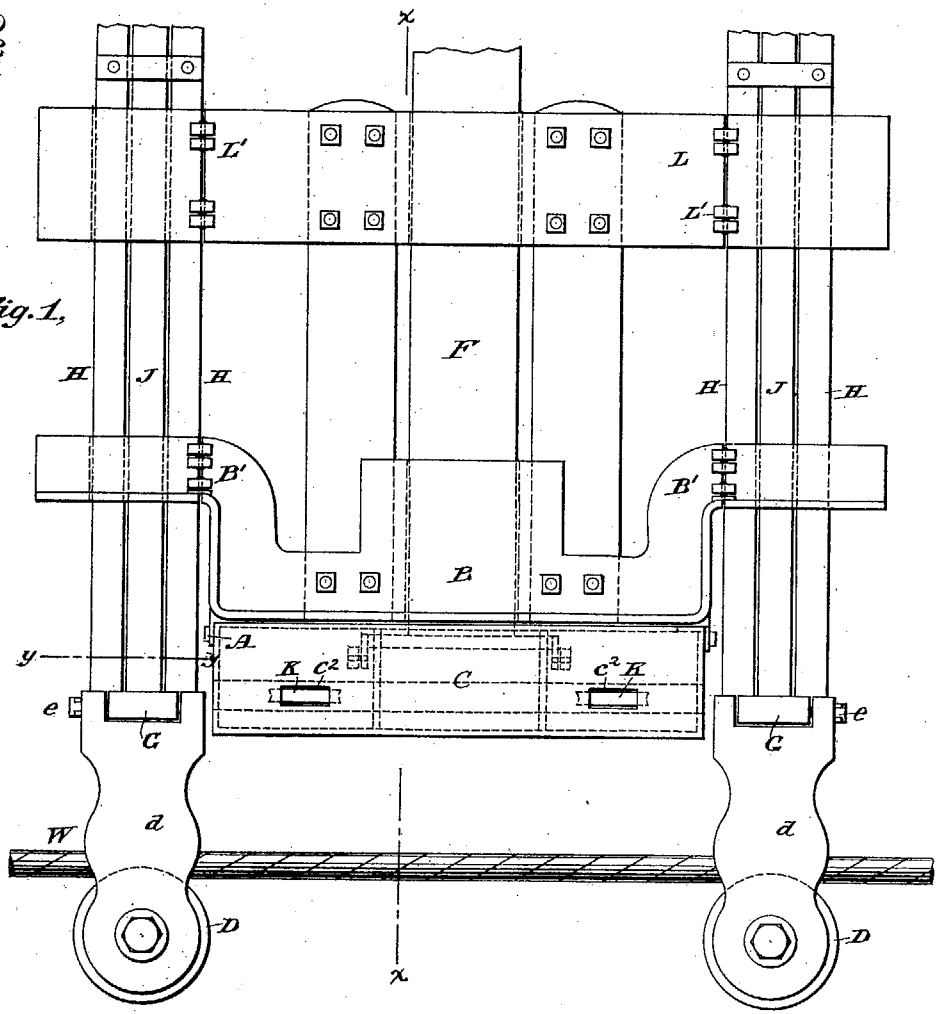

Figure 1 is a side elevation of my new and improved grip, showing the lifting-wheels below the cable ready for lifting it. Fig. 2 is an edge view of the same, showing the lifting-wheels lowered and open in full lines and closed under the cable in dotted lines. Fig. 3 is a similar view showing the lifting-wheels closed below the cable ready for lifting it. Fig. 4 is an edge view showing the position of the parts of the grip after the cable has been raised and grasped by the jaws of the grip. Fig. 5 is a transverse sectional elevation taken on the line *x x* of Fig. 1. Figs. 6 and 7 are sectional plan views taken, respectively, on the lines *y y* and *z z* of Figs. 1 and 2; and Fig. 8 is an enlarged front elevation of one of the jaws of the grip. Fig. 9 is a detail view of the grip closed on the cable, one jaw being in section and the other broken away.

I employ two parallel rods, A A, held in hangers forming a part of or attached to the iron frame-pieces B B, and on these rods A A, I hinge, preferably by means of the hooks *a a*, the jaws C C of the grip. The jaws C are each composed of a shell, *c*, of wrought, cast, or sheet iron, filled with a filling, *c'*, of wood, lead, brass, vegetable fiber, leather, or other soft metal or non-metallic material, so that the jaws will present a grasping-surface to the cable W which will not materially abrade or chafe it. The jaws C are suspended from the said parallel rods A A between the sets of lifting devices or wheels D D' and their connections, which lifting devices are adapted to be opened and closed and lowered and raised for lifting the cable W from the position shown in Figs. 1, 2, and 3, where it rests upon the sheaves of the road, to the position shown in Figs. 4 and 5, and in dotted lines in Fig. 8, where it comes between the jaws C C in position to be grasped by them.

The jaws C C are operated for causing them to grasp and release the cable W by a vertically-movable hinge-and-toggle arrangement, consisting in this instance of the two toggle rods or connections *b b*, attached to the jaws and crossed and hinged at their upper ends to the hinge-plate E. (Shown clearly in Fig. 7.) The hinge-plate E is attached to or formed with the vertically-movable rod or plate F, so that when the rod F is lifted the plate E will also be raised, which will cause the toggle rods or levers *b b* to draw the jaws C C together and cause them to grasp the cable firmly. When the rod F is lowered, the plate E will also be lowered, which will cause the toggle rods or levers *b* to spread the jaws C and release the cable.

The wheels D D' are journaled on gudgeons or short shafts attached to the lower ends of the arms or plates *d d*, which are hinged by pins or bolts *e e* to the plates G, attached to the vertically-movable rods or plates H H, so that by raising and lowering the rods or plates H the wheels D D' will accordingly be raised and lowered—that is, lowered to a position just below the cable W, as shown in Figs. 1, 2, and 3, and raised to the position shown in Figs. 4 and 5. At the time the wheels D D' are lowered they are opened or spread away from each other to straddle the cable W, as shown in full lines in Fig. 2, and before they are raised they are brought together below the cable, as shown in dotted lines in said Fig. 2, so that when raised they will lift the cable up between the jaws C C. For operating the wheels D D′ in this manner—that is, for opening and closing them—I employ in this instance a vertically-movable hinge-and-toggle arrangement consisting of the toggle-levers *f f* and the hinge-plate J′, attached to the lower end of the vertically-movable bar or plate J. The levers *f f* are attached at their lower ends to the suspending arms or plates *d d*, and then crossed and hinged at their upper ends to the plate J′, so that when the rod or plate J is forced downward levers *f* will act to spread the wheels D D′, and when raised will act to close or draw them together. The plate J works between the two vertically-movable plates H, and reaches down through an opening, *j*, in plate G to the plate J′, so that this latter plate is held immediately below the plate G.

In the jaws C C are journaled in the openings $c^2$ $c^2$ the horizontal wheels K K, preferably two in each jaw, the wheels in one jaw being placed opposite to those in the other, and the wheels are concaved at the edges, as shown in the drawings, to fit and grasp the cable, and the concaved edges of the wheels K reach into the grooves $c^3$ $c^3$, made in the filling material *c′* of the jaws to receive the cable, so that the wheels when the jaws are closed will grasp the cable first, and to permit the rollers K to yield and allow the jaws themselves to close upon the cable, I elongate their bearings and place in the same rubber or other springs *k*, as shown in Fig. 9. By this construction the wheels will be forced outward by the spring with sufficient force to grasp the cable and start the car, and then (the car being started) the jaws will be closed, so that the solid portions of the jaws will grasp the cable with a "dead" grasp and effect a very secure and firm grip on the cable, so that there will be no danger of the cable slipping. The wheels K serve as a yielding or rolling grasp, so that the car partakes of the motion of the cable gradually, and these wheels prevent the cable from being marred and injured by the jaws.

The hollow frames L, together with the frame-pieces B, will be secured to the bottom of the car by suitable timbers, and the bars or plates F, H, and J pass up through the frames B L, so that they may be raised and lowered by levers and connections above the frame L, which are not shown, as they form no part of my present invention.

In order that no difficulty will be experienced with the grip in passing curves in the track and cable, I form hinges B′ B′ and L′ L′ in the frame-pieces B and L, respectively, as shown in Fig. 1, so that the elevating and gripping mechanism may swing to the right or left, to take and follow the cable independent of the main body of the main frame of the grip.

Having thus described my invention, what I claim as new, and desire to secure by Letters Patent, is—

1. The combination, with the jaws or grasping devices of a cable-grip and a vertically-movable lifting device, of toggle-levers for opening and closing the lifting devices, substantially as and for the purposes set forth.

2. The combination, with lifting-wheels and hinged arms carrying the same, of a sliding bar and toggle-levers connected to said bar and hinged arms, substantially as herein shown and described.

3. The lifting devices D D′, attached to the arms *d*, hinged to the plates G, in combination with the toggle-levers *f f*, attached to the arms *d*, and plate J′, attached to the vertically-movable rod J, whereby the lifting devices may be opened and closed by raising and lowering the rod J, substantially as described.

4. The hinged arms *d d*, carrying lifting devices D D′ at their lower ends and hinged at their upper ends to the plate G, attached to vertically-movable rods H, in combination with vertically-movable bar J, plate J′, and toggle-levers *f f*, hinged to plate J′ and to arms *d*, whereby vertical movement of rod J will open and close lifting devices D D′ and vertical movement of plates H will raise or lower the whole lifting device, substantially as described.

5. The grasping-jaws C, formed of a shell, *c*, with a filling, *c′*, of soft metal or non-metallic substance, substantially as and for the purposes described.

6. The combination, with the jaws C, of the yielding grasping-wheels K, journaled in the said jaws, substantially as and for the purposes set forth.

7. The jaws C, hinged upon or suspended from suitable rods, A, in combination with the vertically-movable rod F, plate E, and toggle-levers *b*, hinged to the jaws and plate E, substantially as and for the purposes set forth.

8. The frame-pieces B and L, formed with hinges B′ and L′, respectively, in combination with main body of the frame and the elevating and gripping mechanism, whereby the grip will follow the curves of the cable, substantially as described.

THOMAS KERR.

Witnesses:
ROBERT N. KENYON,
EDWIN SEGER.